United States Patent
Barna

(10) Patent No.: US 9,308,874 B2
(45) Date of Patent: Apr. 12, 2016

(54) MICROPHONE DEVICE FOR INSTALLATION IN A VEHICLE

(71) Applicant: AUDI AG, Ingolstadt (DE)

(72) Inventor: Klaus-Dieter Barna, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/427,734

(22) PCT Filed: Aug. 9, 2013

(86) PCT No.: PCT/EP2013/002391
§ 371 (c)(1),
(2) Date: Mar. 12, 2015

(87) PCT Pub. No.: WO2014/040674
PCT Pub. Date: Mar. 20, 2014

(65) Prior Publication Data
US 2015/0210224 A1    Jul. 30, 2015

(30) Foreign Application Priority Data

Sep. 12, 2012   (DE) .......................... 10 2012 017 980

(51) Int. Cl.
*H04R 9/08*      (2006.01)
*B60R 11/02*     (2006.01)
(Continued)

(52) U.S. Cl.
CPC *B60R 11/02* (2013.01); *H04R 1/04* (2013.01); *H04R 1/083* (2013.01); *H04R 2499/13* (2013.01)

(58) Field of Classification Search
CPC ...... H04R 2499/13; H04R 1/04; B60R 11/02; B60R 2001/1284; B60R 11/0247; B60R 2001/1223; H04B 1/3822

USPC ........................................ 381/365, 355, 361
See application file for complete search history.

(56) References Cited

U.S. PATENT DOCUMENTS

2003/0165251 A1   9/2003  Pribyl
2004/0204167 A1  10/2004  Lane
(Continued)

FOREIGN PATENT DOCUMENTS

DE         10046874      5/2001
DE      202008001684     6/2008
(Continued)

OTHER PUBLICATIONS

German Office Action for German Priority Patent Application No. 10 2012 017 980.4, issued Jul. 8, 2013, 6 pages.
(Continued)

*Primary Examiner* — Sunita Joshi
(74) *Attorney, Agent, or Firm* — Staas & Halsey LLP

(57) ABSTRACT

A microphone device for an automobile has a microphone capsule for detecting ambient noise and a housing in which the microphone capsule is arranged. The microphone device is intended to have a small installation depth and to be capable of being easily installed in an automobile. An electrical connection interface which includes externally accessible connection contacts for making electrical contact with the microphone capsule located in the housing, is provided in the microphone device. The connection contacts are integrated into a mechanical plugging apparatus for plugging together with a complementary plugging part of an electronic device of the automobile. The connection interface of the microphone device is configured in a cableless fashion here in that the plugging apparatus is embodied as a part of the housing.

18 Claims, 3 Drawing Sheets

(51) Int. Cl.
    *H04R 1/08*    (2006.01)
    *H04R 1/04*    (2006.01)
    *G01S 3/80*    (2006.01)

(56) References Cited

U.S. PATENT DOCUMENTS

| | | |
|---|---|---|
| 2005/0008184 A1 | 1/2005 | Ito et al. |
| 2006/0135216 A1 | 6/2006 | Collavo et al. |
| 2007/0058821 A1 | 3/2007 | Welsh et al. |
| 2008/0137895 A1 | 6/2008 | Gratke et al. |
| 2010/0124348 A1 | 5/2010 | Larson et al. |
| 2011/0088479 A1 | 4/2011 | Urase et al. |
| 2011/0164759 A1 | 7/2011 | Gratke et al. |
| 2011/0242942 A1* | 10/2011 | Tsuzuki .................. G01S 7/521 367/121 |
| 2012/0008794 A1 | 1/2012 | Gratke |

FOREIGN PATENT DOCUMENTS

| | | |
|---|---|---|
| DE | 102007059452 | 7/2008 |
| DE | 102008039314 | 2/2010 |
| DE | 202009010884 | 1/2011 |
| DE | 112009001490 | 4/2011 |
| DE | 102011106073 | 3/2012 |
| EP | 1332922 | 8/2003 |
| JP | 2010-62800 | 3/2010 |

OTHER PUBLICATIONS

English language International Search Report for PCT/EP2013/002391, mailed Oct. 31, 2013, 3 pages.

WIPO English language translation of the International Preliminary Report on Patentability for PCT/EP2013/002391, downloaded from WIPO website on Mar. 12, 2015, 6 pages.

* cited by examiner

MICROPHONE DEVICE FOR INSTALLATION IN A VEHICLE

CROSS REFERENCE TO RELATED APPLICATIONS

This application is based on and hereby claims priority to International Application No. PCT/EP2013/002391 filed on Aug. 9, 2013 and German Application No. 10 2012 017 980.4 filed on Sep. 12, 2012, the contents of which are hereby incorporated by reference.

BACKGROUND

The invention relates to a microphone device for installation in an automobile. Such a microphone device can be used, for example in a hands-free system for detecting a voice signal. The microphone device has, for detecting ambient noise, a microphone capsule which is arranged in a housing of the microphone device. The microphone capsule can be secured, for example, in a trim part of the automobile by the housing. A corresponding trim part and an automobile with such a trim part are also components of the invention.

A microphone device of the specified type is known, for example, from DE 20 2009 010 884 U1. Accordingly, a circuit board with an amplifier circuit is also integrated into the housing of the microphone device in order to be able to amplify the electrical microphone signal. The amplified signal is conducted out of the microphone device via a cable of a motor-vehicle-side on-board line set. The cable is for this purpose routed into the housing and to the circuit board through a cable feedthrough in the housing. The cable feedthrough at the same time ensures tensile relief. With this microphone device it may be relatively laborious to place the cable in contact with the circuit board. For this purpose, the housing must be open. In addition, the microphone device has an undesirably large installation depth.

SUMMARY

One potential object is to make available a microphone device with a relatively small installation depth and at the same time to ensure easy mounting of the microphone device in an automobile.

The inventor proposes a microphone device that has a housing in which at least one microphone capsule for detecting ambient noise is arranged. The term microphone capsule is to be understood as meaning, in particular, a component with its own microphone housing which measures only a few millimeters and contains a microphone diaphragm and associated acoustically active volume. By the housing of the microphone device the microphone capsule can be easily secured in an automobile and shielded against solid-borne sound.

In order to be able to make electrical contact with the microphone capsule located in the housing, i.e. in order to be able to conduct its electrical microphone signal (in an amplified or unamplified form) to an electronic device of the automobile, the microphone device also comprises an electrical connection interface. The latter has connection contacts which are accessible from outside the housing. It is therefore not necessary to lay a cable into the housing, in contrast with what was described at the beginning.

So that, for example, a cable of an external electronic device can also be connected to the connection interface in a mechanically loadable fashion, the connection contacts are integrated into a mechanical plugging apparatus which is preferably configured as a plug or as a plug-in tray. This plugging apparatus is designed to be plugged together with a plugging part of the electronic device which is shaped in a complementary way to the plugging apparatus. If the plugging apparatus is therefore implemented, for example, as a plug-in tray, a plug of a cable can therefore be plugged therein. The connection interface of the microphone device itself, that is to say for example the plug-in tray, is, however, configured here in a cableless fashion according to the proposals. For this purpose, the plugging apparatus is embodied as a part of the housing itself.

The microphone arrangement with the cableless connection interface has the advantage that there is no flexible cable end protruding from the housing of the microphone arrangement, which could be an impediment during installation. The complementary plugging part of the external electronic device can conveniently be connected to the plugging apparatus after the installation of the microphone device. In addition, the absence of pigtail gives the microphone arrangement a relatively small overall height.

Embodying the plugging apparatus as a plug-in tray provides the further advantage that the connection contacts in the plug-in tray are screened against mechanical influences and are therefore protected against inadvertent deformation. Regardless of the embodiment of the plugging apparatus as a plug or as a plug-in tray, the connection contacts can each be configured, for example, as a pin or as a socket (i.e. as a tubular contact) or as a tongue.

In a further refinement, the housing is formed from at least two housing shells which together form the housing. As a result, particularly simple assembly is brought about since the microphone capsule, the connection contacts and, if appropriate, further components can be positioned in one of the housing shells and then covered with a further housing shell and, if appropriate, clamped tight between the housing shells. Particularly simple handling during assembly is obtained by providing a hinge, for example a film hinge, which connects the housing shells even in the opened state. In order to hold the housing shells together after the closing process, for example a snap-type connection or a bonded connection can be provided. One preferred embodiment provides, however, a securing element, for example a ring, into which the housing shells are plugged. The securing element therefore surrounds the housing shells and as a result holds them together. The housing can in turn be secured in the securing element by a snap-type connection.

A securing element for plugging in the housing has the advantage that the housing shells are surrounded by a component which is embodied in one piece, with the result that a connection cannot open and the housing shells cannot fall apart. In addition, different materials can be used for the housing and the securing element.

One development of this embodiment relates to a sound inlet opening of the housing for the entry of the ambient noise into the housing. The sound inlet opening is preferably to be covered by a sound-permeable cover element, in particular made of felt or fabric. The slip-free attachment of the cover element is generally very costly. In contrast, in the microphone device the cover element can be clamped between the housing and the securing element and therefore reliably secured in front of the sound inlet opening.

Further simplification of the microphone design is obtained if the microphone device also has a decorative edge for the sound inlet opening, which decorative edge can be seen from the outside in the installed state of the microphone device in the automobile. It is then possible to dispense with an additional cover plate for the microphone arrangement.

Such a decorative edge is formed in one development by a region of the securing element which bounds the sound inlet opening. The decorative edge can be, for example, a chrome ring or a high-gloss surface.

An additional advantage of dispensing with an additional cover plate is that a sound inlet of the microphone capsule can be arranged very close to the surface of that component of the automobile into which the microphone device is installed, that is to say for example a roof module or some other trim part. The sound inlet of the microphone capsule ideally terminates in a planar fashion with this surface. This results in the particularly desirable acoustic properties of the arrangement composed of the microphone device and trim part. Correspondingly, a distance of the microphone capsule from the decorative edge is preferably less than 5 mm, in particular less than 3 mm, in terms of absolute value.

In order to be able to use the microphone device in a standardized fashion for different automobile models which are configured for right-hand drive vehicles (left-hand driving as for example in Great Britain) or for left-hand drive vehicles (right-hand driving as for example in Germany or in the USA), position encoding must be possible for installation of the microphone device in the automobile. As a result, when the microphone device is installed it is ensured that the microphone capsule points in the desired direction. According to one development, for the purpose of position encoding latching elements are formed along a circumference of the microphone arrangement, which latching elements are shaped differently and/or are arranged at unequal intervals along the circumferential direction and/or laterally offset differently transversally with respect to the circumferential direction. The latching elements which are provided can be, for example, latching slots or latching projections or a mixture thereof. The differences of the configuration of the latching elements or their irregular arrangement ensure a uniquely defined installation position in a mount of the automobile by virtue of corresponding opposing elements.

In order to keep the installation depth of the microphone device, that is to say the required depth of, for example, an installation shaft in a trim part, particularly small, it is possible to provide for a correct plugging direction for plugging together the plugging apparatus with the complementary plugging part of the electronic device, that is to say for example the plugging-in direction of a plug into the plug-in tray, to be oriented perpendicularly or at least transversally with respect to a correct installation or insertion direction in which the microphone device must be inserted into a mount of the trim part for installation.

As already stated, the proposals also include such a trim part for an automobile. The trim part may be, for example, a roof module for lining a roof lining or a light element or part of a dashboard. The trim part has a mount apparatus for an embodiment of the microphone device, wherein the trim part has a visible side which can be seen in the installed state of the trim part in the automobile. The mount apparatus provides an opening in the visible side through which the microphone device can be introduced into the trim part from the visible side. This advantageously results in a mounting direction from the front side of the trim part, which has proven favorable for the length of the mounting process and the avoidance of incorrect maneuvers during the mounting process.

The mount apparatus preferably has at least one stop element through which an insertion path of the microphone device into the trim part is limited to a predetermined length. It is then not possible for the microphone device to break through, with the result that a surface of the microphone device can terminate in a planar fashion with the visible side of the trim part without complex adjustment being necessary for this. In contrast, in the case of microphones which are mounted on the rear, such adjustment is necessary in many cases.

A shape of a decorative edge of the microphone device can be adapted to a strake of the trim part, defined by the visible surface, and/or to a contour of the opening in the visible side.

The inventor also proposes an automobile. The latter has an embodiment of the proposed microphone device or at least one embodiment of the proposed trim part.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
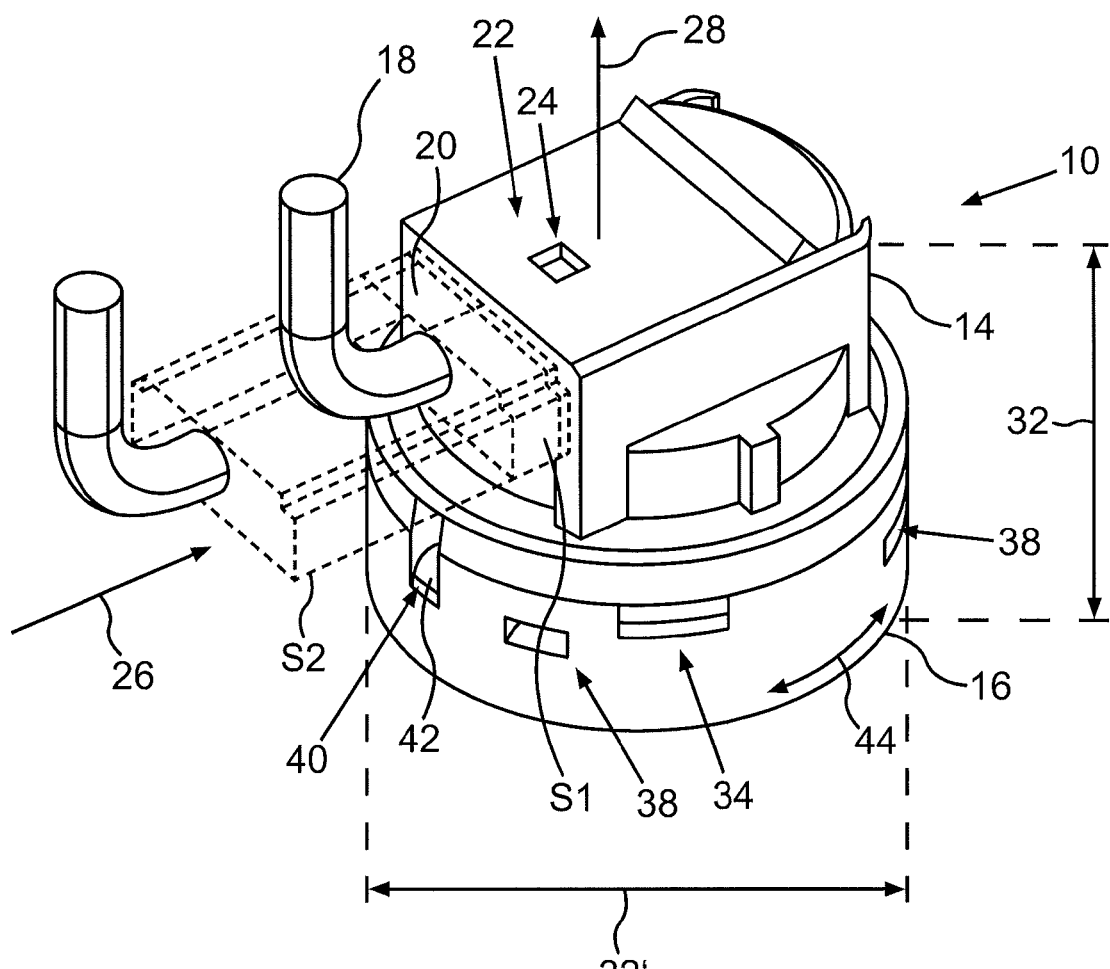
FIG. 1 shows a schematic illustration of an embodiment of the proposed microphone device, wherein a perspective view of a rear side is shown which is not visible in the installed state.

Reference will now be made in detail to the preferred embodiments of the present invention, examples of which are illustrated in the accompanying drawings, wherein like reference numerals refer to like elements throughout.

In the example explained below, the described components of the embodiment each represent individual features which are to be considered independently of one another and which each also develop the proposals independently of one another and therefore also are to be considered components of the proposals individually or in another combination than that shown.

Figure 2:
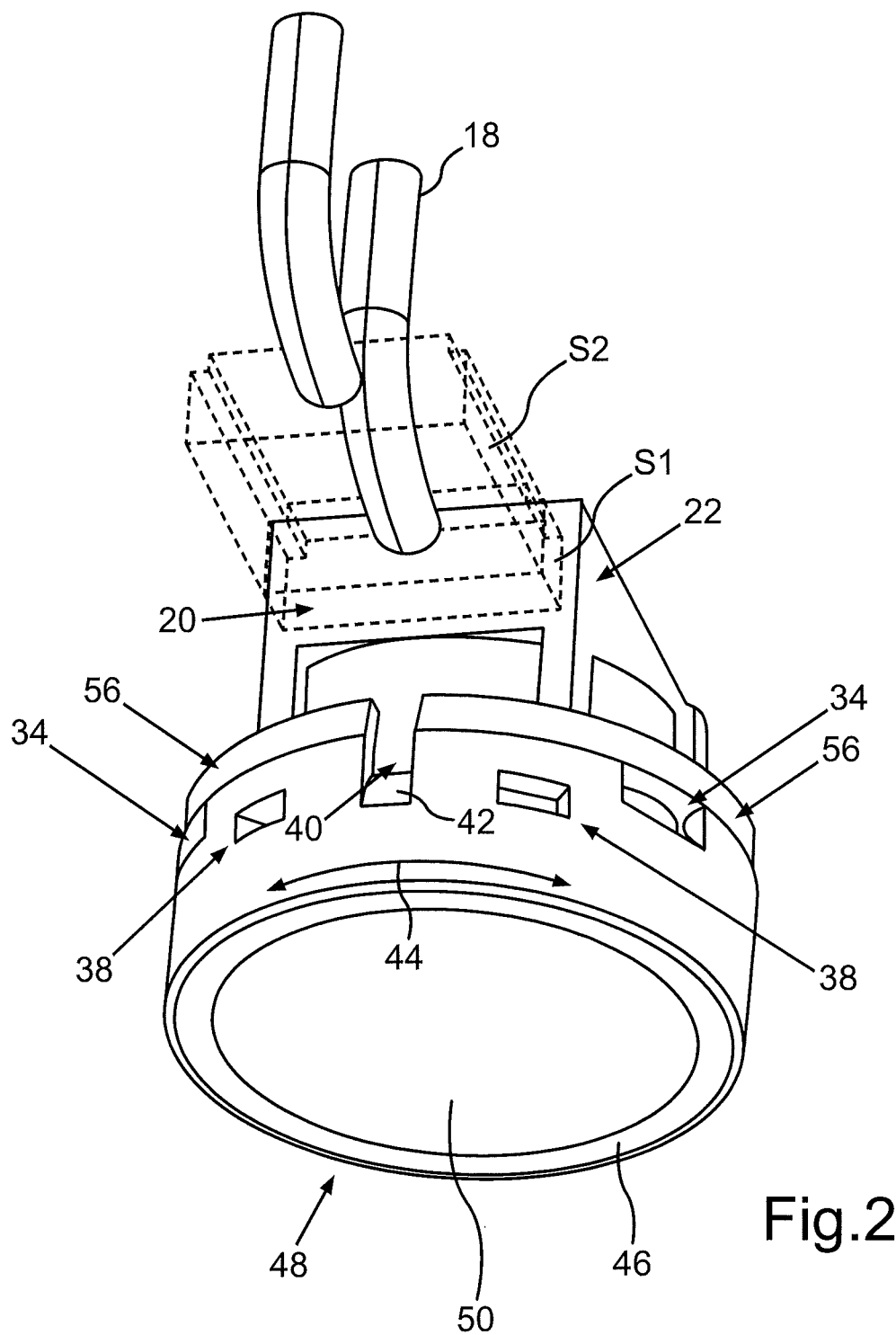
FIG. 2 shows a schematic illustration of a perspective view of a front side of the microphone device in FIG. 1 which is visible in the installed state in a passenger compartment.
Figure 3:
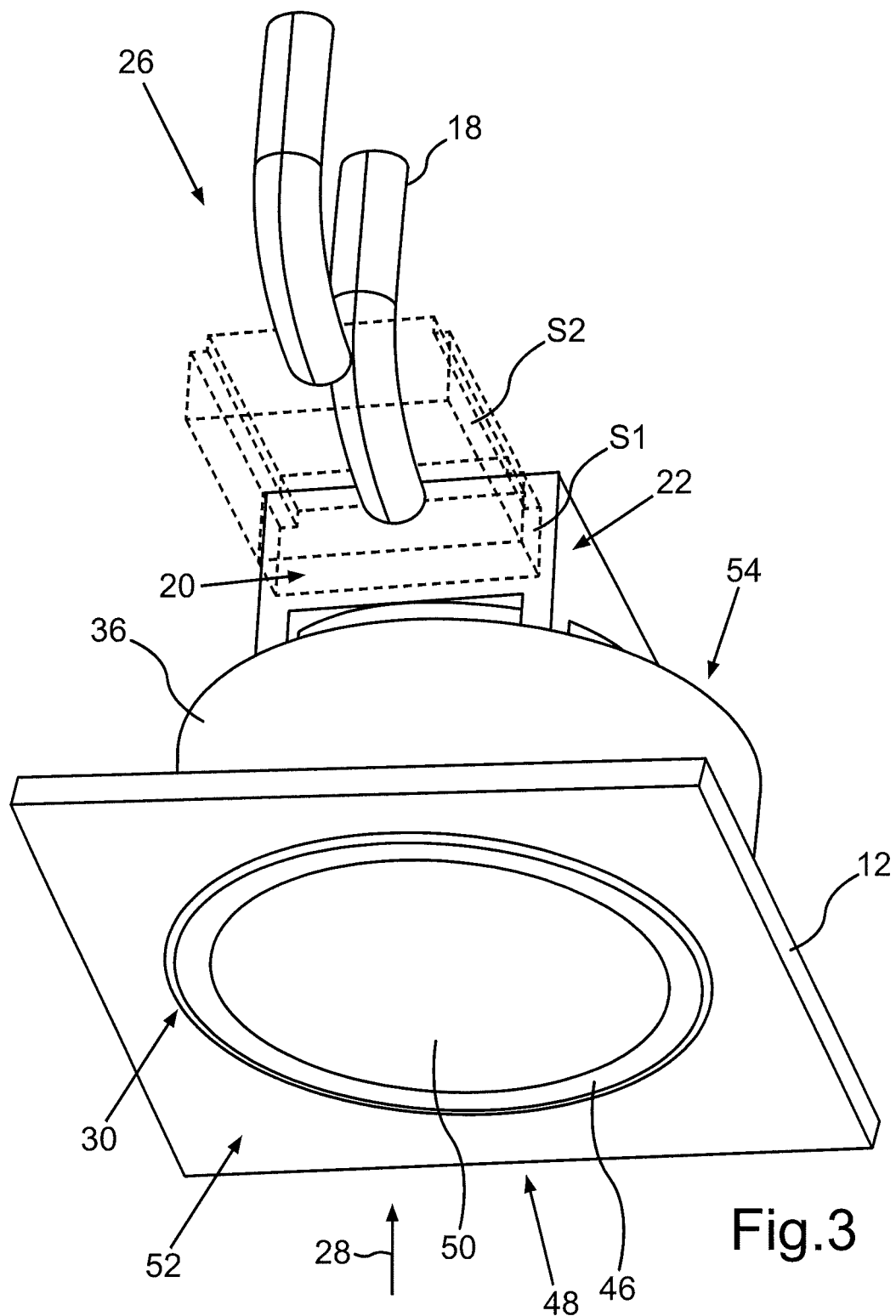
FIG. 3 shows a schematic illustration of a perspective view of the microphone device from FIG. 1 in the installed state.

FIG. 1 to FIG. 3 show a microphone device 10 which can be installed for sound transduction, for example for a hands-free device or for a voice recognition system in an automobile. The automobile may be, in particular, a passenger car. The microphone device 10 can be installed in a trim part 12 of the automobile, for example a ceiling trim part, a trim part of a ceiling light or a part of a dashboard. Only a section of the trim part 12 is shown in FIG. 3.

The microphone device 10 comprises a housing 14 and a securing element 16 into which the housing 14 can be plugged. A microphone capsule and connection contacts for the microphone capsule are installed in the housing 14 (not illustrated). The microphone capsule can be optionally coupled here to the connection contacts, for example an amplifier circuit and/or a circuit for impedance matching, via further electrical and electronic components. A diameter of the microphone capsule may be, for example, 15 mm.

The microphone device 10 is connected to a cable 18. In the example shown, the cable 18 has a plug 20 which is plugged into a plug-in tray 22 of the microphone device 10 and is secured there, for example by a snap-type connection 24. The connection contacts of the microphone device 10 are integrated into the plug-in tray 22 and electrically connected to wires (not illustrated) of the cable 18 via the plug 20. The plug-in tray 22 secures the cable 18 mechanically to the microphone device 10 via the plug 20 of said cable 18. The plug-in tray 22 with connection contacts integrated therein therefore constitutes overall a connection interface of the microphone device 10 for connecting an electrical terminal, here that of the cable 18. Electrical signals of the microphone capsule are transmitted via the cable 18 to an electronic device of the automobile, for example the abovementioned hands-free device or the voice system.

The plug-in tray 22 is embodied as a component of the housing 14. The connection interface is therefore cableless, i.e. there is no pigtail associated with the microphone device 10 protruding from the housing 14. This is advantageous, in particular, during the installation of the microphone device 10 into the trim part 12. The cable 18 must firstly be connected to the microphone device 10 after the installation of the microphone device 10. For this purpose, the plug 20 is inserted into the plug-in tray 22 along a plugging-in direction 26. FIG. 1 to FIG. 3 show two plug positions S1 and S2 in order to illustrate the plugging-in path. In the plug position S1, the plug 20 is completely plugged into the plug-in tray 22. In contrast, directly before plugging in the plug 20 is in the plug position S2. In the example shown, the plugging-in direction 26 is oriented perpendicularly with respect to an installation direction 28. In order to insert the microphone device 10 into the trim part 12, the microphone device 10 was plugged into an installation opening 30 in the trim part 12 along the installation direction 28. The perpendicular orientation of the plugging-in direction 26 and of the installation direction 28 results in an advantageous, low overall height 32 of the microphone device 10 with the plugged-in cable 18. In the example shown, the overall height may be less than 25 mm, in particular less than 22 mm.

The housing 14 is plugged into the securing element 16 and can be secured there, for example, by snap-type connections 34 or else by a bonded connection. The securing element 16 is in turn plugged into a mount 36 of the trim part 12 and is secured there, for example, by a snap-type connection. For this purpose, the securing element 16 then has, for example, latching slots 38 into which latching projections of the mount 36 can engage. In addition, the securing element 16 can also have a guide slot 40 in which a projection 42 of the housing 14 is arranged. The housing 14 can then be plugged into the securing element 16 only if the projection 42 is in the guide slot 40. Otherwise, the movement of the housing 14 is blocked by the projection 42 during plugging in. The projection 42, the guide slot 40 and the snap-type connections 34 together form position encoding for the housing 14 in the securing element 16. Likewise, the latching slots 38 are not arranged at equal intervals along a circumference 44 of the microphone device 10. This results in a position encoding for the securing element 16 with respect to the mount 36. The two position encoding configurations ensure a uniquely defined position of the microphone capsule of the microphone device 10 with respect to the trim part 12.

By corresponding arrangement of latching elements in the mount 36 it is therefore possible to use the same type of microphone device 10 for an automobile with right-hand steering as well as for an automobile with left-hand steering. An incorrect installation position is effectively avoided by the position encoding of the securing element 16 with respect to the mount 36.

The microphone device 10 can be mounted very easily. The housing 14 can for this purpose be fabricated, for example, from two housing shells in order to be able to arrange the microphone capsule and the other components in the housing 14. The housing shells can be connected, here, for example, by a hinge. After the closing of the housing 14, the housing 14 can be plugged into the securing element 16. The securing element 16 is for this purpose embodied in the present example as a ring which surrounds the plugged-in housing 14 and therefore holds the housing shells together. For this reason, it is possible to dispense with a separate closure mechanism for the housing shells.

The housing 14 and the securing element 16 can be fabricated, for example, from plastic, and, for example, by injection molding. The housing 14 and the securing element 16 can be fabricated here from different materials. This has the advantage that a particular solid-borne-sound-insulating material can be selected for the housing 14, and independently of this a particularly solid material can be selected for the securing element 16 to bring about reliable securing in the mount 36.

The plugging-in path of the housing 14 into the securing element 16 can be limited by a ring 46 of the securing element 16. The ring 46 forms an edge of a sound inlet opening 48 of the securing element 16, through which sound inlet opening 48 sound can pass from the passenger compartment of the automobile to a sound inlet opening (not illustrated) of the housing 14 and finally to the microphone capsule. The diameter 32' of the ring 46 can be, for example, smaller than 26 mm. This also corresponds (in the case of circular configuration) to the overall diameter of the microphone device 10 in the direction perpendicular to the installation direction 28.

The sound inlet opening of the housing 14 is protected by a sound-permeable cover 50 against the ingress of particles, such as dust or dirt. The cover 50 can be fabricated, for example, from a felt or gauze. When the microphone device 10 is mounted, the cover 50 can be positioned in the securing element 16 and clamped tight between the housing 14 and the ring 46. This mounting is very efficient. The cover 50 can be additionally bonded.

In the installed state of the microphone device 10, the ring 46 can be arranged in the trim part 12 in such a way that it can be seen by an automobile occupant.

The ring 46 then forms a decorative edge and can be, for example, chrome-plated or provided with a high-gloss surface. The ring 46 then preferably terminates in a planar fashion with a surface of a visible side 52 of the trim part 12, which visible side 52 points toward the passenger compartment of the automobile. The ring 46 can, however, also protrude, or be countersunk, for example up to 5 mm from or into the trim part 12. In order to make the orientation of the microphone device 10 easy with respect to the surface of the visible side 52 during the installation of said microphone device 10, the mount 36 can have a stop 54 (not illustrated) which correspondingly limits the insertion path of the microphone device 10 along the installation direction 28 in the mount 36.

A further simplification of the mounting is obtained if the securing element 16 has a beveled edge 56 which firstly makes contact with the trim part 12 in the installation opening 30 when the microphone device 10 is plugged in. As a result, the securing device 16 slides more easily into the installation opening 30.

As a result of the installation from the visible side 52 and as a result of the planar termination of the ring 46 with the visible side 52 (or a slightly protruding arrangement), the microphone capsule can be arranged particularly close to the plane of the installation opening 30. As a result, particularly good acoustic properties for the detection of sound, which is also referred to as a performance, are obtained.

The securing element 16 does not necessarily have to be embodied as a ring (as illustrated here). It is decisive that a contour of the sound inlet opening 48, that is to say here the inner contour of the ring 46, promotes the passage of sound to the microphone capsule. On the other hand, the outer contour of the securing element 16 in the region of the installation opening 30 should be adapted to the contour of the installation opening 30 in order to avoid an excessively large visible gap, it being possible, for example, also to make the installation opening 30 rectangular. A small gap dimension is also beneificial for the acoustic properties of the microphone arrangement, i.e. the performance.

However, the securing element 16 cannot only be easily adapted to the contour of the installation opening 30. The securing element 16 (and also securing elements according to other embodiments) have the advantage that the microphone device can also easily be adapted to a strake, defined by the visible surface, of a trim part, that is to say to a profile of a curvature of the visible surface. The visible surface (here the visible surface 52) can therefore be a free-form surface and nevertheless the decorative edge (here the decorative ring 46), can visually merge in shape and contour with the surrounding visible surface without, for example, costly sealing measures being necessary for the acoustic performance. The proposed microphone device therefore advantageously permits additional degrees of freedom in terms of design.

The arrangement of the microphone capsule in the housing 14 and the enclosure of the securing element 16 by the mount 36 can also be configured in a sealed fashion with little expenditure such that no further sealing elements have to be provided to protect the microphone capsule against rearward-directed sound. The acoustic system is, in particular, sufficiently enclosed per se by the arrangement of the microphone capsule in the housing.

The example shows how it is possible to implement a microphone concept in which a single design can be made available for a microphone device both for right-hand drive automobiles and for left-hand drive automobiles. Direct plugging of the connecting cable to the microphone device, i.e. a pigtail can be dispensed with on the part of the microphone device and there is no need to lay any cables during installation. A plug-in tray which is formed by the housing permits a low overall height.

The microphone is accommodated in a visible fashion. A cover for the sound inlet opening and a decorative ring can already be present here in the microphone device and therefore do not need to be attached to the automobile in a separate assembly process when constructing the automobile.

An acoustically optimum distance of the microphone capsule from the outer contour of a roof module or of some other trim part can be ensured with little expenditure. Mounting takes place for this purpose from the front side of the roof module or trim part. There is also no need for any additional sound seal. The microphone device is effectively prevented from being pushed through during assembly by a stop in the mount.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A microphone device for an automobile, comprising:
a microphone capsule to detect ambient noise;
a housing to secure the microphone capsule, the microphone capsule being positioned within the housing, the housing comprising:
at least two housing shells; and
a securing element which at least partially surrounds the housing shells, the housing shells being plugged into the securing element so that the securing element holds together the housing shells; and
an electrical connection interface which comprises:
externally accessible connection contacts for making electrical contact with the microphone capsule located in the housing; and
a mechanical plugging apparatus embodied as part of the housing, the connection contacts being integrated into the plugging apparatus, the plugging apparatus plugging together with a complementary plugging part of an electronic device of the automobile such that electrical connection is made to the microphone capsule in a cableless fashion.

2. The microphone device as claimed in claim 1, wherein the plugging apparatus is configured as a plug or as a plug-in tray.

3. The microphone device as claimed in claim 1, wherein the securing element is a ring into which the housing shells are plugged.

4. The microphone device as claimed in claim 1, wherein
the housing comprises a sound inlet opening for the ambient noise,
the sound inlet opening is covered by a sound-permeable cover element, and
the sound-permeable cover element is clamped between the housing shells and the securing element.

5. The microphone device as claimed in claim 4, wherein the sound-permeable cover element is formed of felt of fabric.

6. The microphone device as claimed in claim 1, wherein
the securing element has a decorative edge which can be seen from a passenger compartment of the automobile when the microphone device is installed in the automobile, and
the decorative edge bounds a sound inlet opening and defines an outer part of the sound inlet opening.

7. The microphone device as claimed in claim 6, wherein the decorative edge limits a plug-in path of the housing shells into the securing element.

8. The microphone device as claimed in claim 6, wherein the microphone capsule is separated from the decorative edge by a distance of less than 5 mm.

9. The microphone device as claimed in claim 6, wherein the microphone capsule is separated from the decorative edge by a distance of less than 3 mm.

10. The microphone device as claimed in claim 1, wherein
position encoding is provided for installation of the microphone device in the automobile,
the position encoding comprises latching elements which are formed along a circumference of the securing element, and
the latching elements are shaped differently, are arranged at unequal intervals along the circumference of the securing element and/or are laterally offset from one another along the circumference of the securing element.

11. The microphone device as claimed in claim 1, wherein
the plugging apparatus plugs together with the plugging part by moving the plugging apparatus and the plugging part in a correct plugging direction with respect to one another,
the microphone device is mounted to the automobile by moving the microphone device in a correct insertion direction with respect to the automobile, and
the correct plugging direction is oriented transversally with respect to the correct insertion direction.

12. The microphone device as claimed in claim 1, wherein
the plugging apparatus plugs together with the plugging part by moving the plugging apparatus and the plugging part in a correct plugging direction with respect to one another,
the microphone device is mounted to the automobile by moving the microphone device in a correct insertion direction with respect to the automobile, and
the correct plugging direction is oriented perpendicular to the correct insertion direction.

13. The microphone device as claimed in claim 1, wherein
the plugging apparatus is embodied as a female receptacle and the plugging part of the electronic device of the automobile is embodied as a male insertion part, and
a snap connection is provided to secure the plugging part within the plugging apparatus.

14. The microphone device as claimed in claim 1, wherein snap connections are provided to secure the housing shells to the securing element.

15. The microphone device as claimed in claim 1, wherein
the securing element has a guide slot,
the housing shells have a projection, and
the projection fits within the guide slot to position the housing shells with respect to the securing element.

16. A trim part for an automobile, comprising:
a microphone device comprising:
   a microphone capsule to detect ambient noise;
   a housing to secure the microphone capsule, the microphone capsule being positioned within the housing, the housing comprising:
      at least two housing shells; and
      a securing element which at least partially surrounds the housing shells, the housing shells being plugged into the securing element so that the securing element holds together the housing shells; and
   an electrical connection interface which comprises:
      externally accessible connection contacts for making electrical contact with the microphone capsule located in the housing; and
      a mechanical plugging apparatus embodied as part of the housing, the connection contacts being integrated into the plugging apparatus, the plugging apparatus plugging together with a complementary plugging part of an electronic device of the automobile such that electrical connection is made to the microphone capsule in a cableless fashion
a trim element having a visible side which faces a passenger compartment of the automobile and can be seen when the microphone device is installed in the automobile, the visible side having an opening through which the microphone device is introduced into the trim element from the visible side; and
a mount apparatus to receive the microphone device, the mount apparatus having at least one stop element through which an insertion path of the microphone device into the mount apparatus is limited to a predetermined length, wherein
the microphone device has a ring, the ring limiting the insertion path such that the ring terminates in a planar fashion with a surface of the visible side of the trim element.

17. The trim part as claimed in claim 16, wherein
the securing element has latching slots,
the mount apparatus has latching projections, and
the latching projections of the mount apparatus engage with the latching slots of the securing element.

18. An automobile having the microphone device as claimed in claim 1.

* * * * *